US010496857B2

(12) United States Patent
Shin et al.

(10) Patent No.: US 10,496,857 B2
(45) Date of Patent: Dec. 3, 2019

(54) APPARATUS AND METHOD FOR AVOIDING CROSS-READING OF RFID USING VISIBLE LIGHT RECOGNITION

(71) Applicants: ELECTRONICS AND TELECOMMUNICATIONS RESEARCH INSTITUTE, Daejeon (KR); IDRO CO., LTD., Suwon-si, Gyeonggi-do (KR)

(72) Inventors: Dong Beom Shin, Daejeon (KR); Yang Gi Kang, Yongin-si (KR); Kwang Jin Oh, Yongin-si (KR); Sang Mok Lee, Suwon-si (KR); Hyun Seok Kim, Jeonju-si (KR); Sang Hyun Mo, Daejeon (KR); Kang Bok Lee, Daejeon (KR)

(73) Assignees: ELECTRONICS AND TELECOMMUNICATIONS RESEARCH INSTITUTE, Daejeon (KR); IDRO CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 16/033,595

(22) Filed: Jul. 12, 2018

(65) Prior Publication Data
US 2019/0147201 A1    May 16, 2019

(30) Foreign Application Priority Data

Nov. 13, 2017   (KR) .......................... 10-2017-0150678

(51) Int. Cl.
*G06K 7/10*    (2006.01)
*H04B 10/116*    (2013.01)

(52) U.S. Cl.
CPC ..... *G06K 7/10108* (2013.01); *G06K 7/10158* (2013.01); *H04B 10/116* (2013.01)

(58) Field of Classification Search
CPC ............ G06K 7/0008; G06K 7/10019; G06K 7/10029; G06K 7/10356; G06K 7/10039;
(Continued)

(56) References Cited

U.S. PATENT DOCUMENTS 7,421,321 B2 *   9/2008   Breed ..................... B60C 11/24
                                                              340/442
9,373,114 B2 *   6/2016   Lewis .................... G07F 19/205
(Continued)

FOREIGN PATENT DOCUMENTS

CN   103956034 A   7/2014
CN   105279544 A   1/2016
(Continued)

*Primary Examiner* — Mark S Blouin
(74) *Attorney, Agent, or Firm* — LRK Patent Law Firm (57) ABSTRACT

A radio frequency identification (RFID) technology which overcomes a cross-reading problem by using visible light recognition and identification values. An RFID reader terminal includes a visible light transmitter configured to transmit a visible light signal including an identification value of the RFID reader terminal, a radio frequency (RF) receiver configured to receive an RF signal including an identification value of an RFID tag terminal and information of the RFID tag terminal from the RFID tag terminal, and a reader controller configured to determine whether the identification value of the RFID reader terminal is identical to the identification value of the RFID tag terminal. In addition, there is provided an RFID tag terminal corresponding to the RFID reader terminal.

18 Claims, 6 Drawing Sheets

(58) Field of Classification Search
CPC .......... G06K 19/0723; G06K 7/10475; G06K 7/10069; G06K 7/10128
USPC ...................................................... 340/10.2
See application file for complete search history.

(56) References Cited

U.S. PATENT DOCUMENTS

| | | | |
|---|---|---|---|
| 9,378,484 B1* | 6/2016 | Russell | G06Q 10/0875 |
| 9,680,533 B2* | 6/2017 | Gudan | H04B 5/0062 |
| 9,888,337 B1* | 2/2018 | Zalewski | H04L 67/10 |
| 10,148,918 B1* | 12/2018 | Seiger | H04N 7/183 |
| 2008/0079578 A1 | 4/2008 | Kim et al. | |
| 2011/0181397 A1 | 7/2011 | Kang et al. | |
| 2015/0229391 A1* | 8/2015 | Choi | H04B 10/116 |
| | | | 398/118 |
| 2016/0371515 A1 | 12/2016 | Jung et al. | |

FOREIGN PATENT DOCUMENTS

| | | |
|---|---|---|
| CN | 106056018 A | 10/2016 |
| EP | 0974924 A2 | 1/2000 |
| JP | 2016-505980 A | 2/2016 |
| KR | 10-2012-0073794 A | 7/2012 |
| KR | 10-1162544 B1 | 7/2012 |
| KR | 10-2013-0040446 A | 4/2013 |
| KR | 10-2013-0140928 A | 12/2013 |
| WO | 2009/002156 A1 | 12/2008 |

* cited by examiner

|  | PC | EPC | READER HANDLE | CRC-16 |
|---|---|---|---|---|
| BIT | 5 | VARIABLE | 16 | 16 |

APPARATUS AND METHOD FOR AVOIDING CROSS-READING OF RFID USING VISIBLE LIGHT RECOGNITION

CROSS-REFERENCE TO RELATED APPLICATION

This application claims priority to Korean Patent Application No. 2017-0150678, filed Nov. 13, 2017 in the Korean Intellectual Property Office (KIPO), the entire content of which is hereby incorporated by reference.

BACKGROUND

1. Technical Field

Example embodiments of the present invention relate in general to an apparatus and method for avoiding cross-reading of radio frequency identification (RFID), and more specifically, to an apparatus and method for avoiding cross-reading of RFID using visible light recognition and a handle value of a command.

2. Description of Related Art

Radio frequency identification (RFID) refers to a technology that identifies an object, such as a manufactured item or a person using a radio frequency (RF), and more specifically, is a technology of recognizing information in an RFID tag using an RFID reader after storing the information in the RFID tag consisting of an antenna and a chip and attaching the RFID tag to a target object.

Recently, such an RFID technology has been stabilized and introduced into various industrial fields. Particularly, the RFID technology has been widely employed in a field of smart factories using process automation. However, the conventional RFID technology only uses an RF technology in transmission/reception links, which causes a cross-reading problem in which an unwanted tag response occurs. Due to such a cross-reading problem, the RFID technology cannot be widely spread.

The cross-reading problem generally occurs when a plurality of tags are used for process automation, factory automation, and a large-scale asset management in one place. Accordingly, in the conventional process automation field, various electromagnetic wave shielding methods have been used to solve such a cross-reading problem of the RFID technology. Here, the electromagnetic wave shielding method is a method of preventing an electromagnetic wave generated from a specific equipment from being leaked to the outside, and in other words, preventing an RF of the RFID from spreading out of a specific space and recognizing another tag. However, such an electromagnetic wave shielding method is costly and cannot completely solve the cross-reading problem.

SUMMARY

Accordingly, example embodiments of the present invention are provided to substantially obviate one or more problems due to limitations and disadvantages of the related art.

Example embodiments of the present invention provide an apparatus for avoiding cross-reading of radio frequency identification (RFID) using visible light recognition.

Example embodiments of the present invention also provide a method of avoiding cross-reading of radio frequency identification (RFID) using visible light recognition.

In some example embodiments, a radio frequency identification (RFID) reader terminal includes a visible light transmitter configured to transmit a visible light signal including an identification value of the RFID reader terminal, a radio frequency (RF) receiver configured to receive an RF signal including an identification value of an RFID tag terminal and information of the RFID tag terminal from the RFID tag terminal, and a reader controller configured to determine whether the identification value of the RFID reader terminal is identical to the identification value of the RFID tag terminal.

The RFID reader terminal may further include a power transmitter configured to transmit power to the RFID tag terminal using a continuous wave (CW).

The reader controller may recognize the information of the RFID tag terminal when the identification value of the RFID reader terminal is identical to the identification value of the RFID tag terminal.

Pulse interval encoding (PIE) may have been performed on the visible light signal.

The RF signal may include the identification value of the RFID tag terminal and the information of the RFID tag terminal through a backscattering method.

Frequency modulation zero (FM0) coding or miller coding may have been performed on the RF signal.

The identification value of the RFID reader terminal may be an arbitrary 16-bit value.

In other example embodiments, an RFID tag terminal includes a visible light receiver configured to receive a visible light signal including an identification value of an RFID reader terminal from the RFID reader terminal, a tag controller configured to store information of an article to which an RFID tag terminal is attached as information of the RFID tag terminal and determine the identification value of the RFID reader terminal as an identification value of the RFID tag terminal, and an RF transmitter configured to transmit an RF signal including the identification value of the RFID tag terminal and the information of the RFID tag terminal to the RFID reader terminal.

The RFID tag terminal may further include a power receiver configured to receive power from the RFID reader terminal through a CW.

PIE may have been performed on the visible light signal.

The RF signal may include the identification value of the RFID tag terminal and the information of the RFID tag terminal through a backscattering method.

FM0 coding or miller coding may have been performed on the RF signal.

The identification value of the RFID reader terminal may be an arbitrary 16-bit value.

In still other example embodiments, a method of recognizing tag information, which is performed by an RFID reader terminal, includes transmitting a visible light signal including an identification value of the RFID reader terminal, receiving an RF signal including an identification value of an RFID tag terminal and information of the RFID tag terminal from the RFID tag terminal, and determining whether the identification value of the RFID reader terminal is identical to the identification value of the RFID tag terminal.

The method may further include transmitting power to the RFID tag terminal through a CW.

The determining of whether the identification value of the RFID reader terminal is identical to the identification value of the RFID tag terminal may include recognizing the information of the RFID tag terminal when the identification value of the RFID reader terminal is identical to the identification value of the RFID tag terminal.

PIE may have been performed on the visible light signal.

The RF signal may include the identification value of the RFID tag terminal and the information of the RFID tag terminal through a backscattering method.

FM0 coding or miller coding may have been performed on the RF signal.

The identification value of the RFID reader terminal may be an arbitrary 16-bit value.

BRIEF DESCRIPTION OF DRAWINGS

The above and other objects, features and advantages of the present invention will become more apparent by describing example embodiments of the present invention in detail with reference to the accompanying drawings, in which.

DETAILED DESCRIPTION OF EXAMPLE EMBODIMENTS

Example embodiments of the present invention are disclosed herein. However, specific structural and functional details disclosed herein are merely representative for purposes of describing the example embodiments of the present invention, and the example embodiments of the present invention may be embodied in many alternate forms and should not be construed as being limited to the example embodiments of the present invention set forth herein.

Accordingly, while the present invention is susceptible to various modifications and alternative forms, specific embodiments thereof are shown by way of example in the drawings and will herein be described in detail. It should be understood, however, that there is no intent to limit the present invention to the particular forms disclosed, but on the contrary, the present invention is to cover all modifications, equivalents, and alternatives falling within the spirit and scope of the present invention. Like numbers refer to like elements throughout the description of the figures.

It will be understood that, although the terms first, second, etc. may be used herein to describe various elements, the elements should not be limited by the terms. The terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Figure 1:
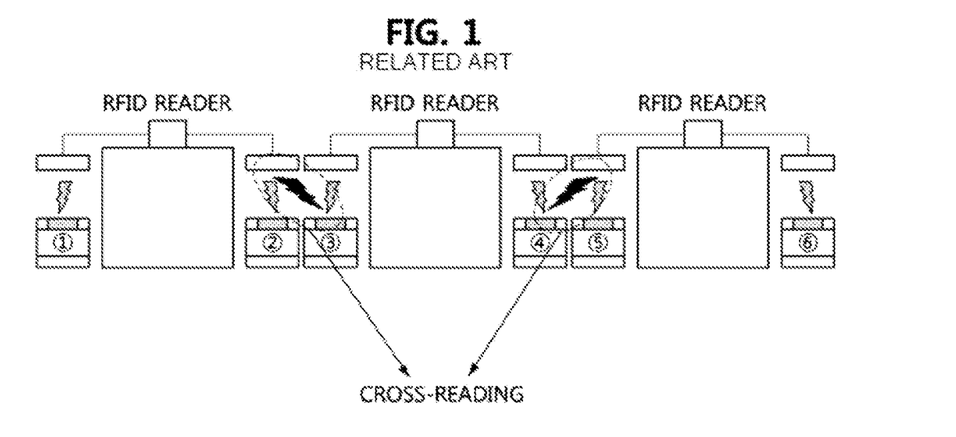
FIG. 1 is a diagram showing a cross-reading problem of a radio frequency identification (RFID) technology.

FIG. 1 is a diagram showing a cross-reading problem of a radio frequency identification (RFID) technology.

The RFID technology may refer to a technology of storing information in an RFID tag composed of an antenna and a chip and recognizing the information in the RFID tag using an RFID reader. More specifically, the RFID technology may refer to a technology of identifying an object, such as a person or a manufactured item to which an RFID tag is attached using a radio frequency (RF) between the RFID tag and an RFID reader.

When articles are transferred through a conveyor belt in facilities, such as factories employing process automation or smart factories, the RFID technology may be used to identify or recognize the article in each lane. In other words, according to the RFID technology used in the factories or the like, an RFID tag is attached to each of the articles and information of each article is stored in each of the corresponding tags. When the articles are transferred through the conveyor belt, an RFD reader disposed on one part of the conveyor belt may automatically collect the information of the article. However, when there are many pieces of equipment in a narrow space, a large number of RFID readers and/or conveyor belts may be placed in close proximity, thereby causing a problem of cross-reading.

Cross-reading may refer to a problem in that an RFID reader does not recognize information in an RFID tag of an article of interest but recognizes information in an RFID tag of another article, thereby collecting incorrect information. Since the RFID technology uses an RF which lacks rectilinearity in propagation, the problem of cross-reading may be caused by the fact that an RF of an RFID reader affects RFID tags of adjacent articles. Therefore, there may be errors caused by cross-reading in product management in the factories.

An example of occurrence of a cross-reading problem is shown with reference to FIG. 1. In FIG. 1, it is assumed that there are six conveyor belts from a first conveyor belt to a sixth conveyor belt, a second conveyor belt and a third conveyor belt are adjacent to each other, and a fourth conveyor belt and a fifth conveyor belt are adjacent to each other. In this case, an RFID reader fails to recognize an article of interest on the second conveyor belt but recognizes an article on the adjacent third conveyor belt, resulting in a cross-reading problem. In addition, the RFID reader fails to recognize an article of interest on the fifth conveyor belt but recognizes an article on the adjacent fourth conveyor belt, resulting in another cross-reading problem.

Figure 2:
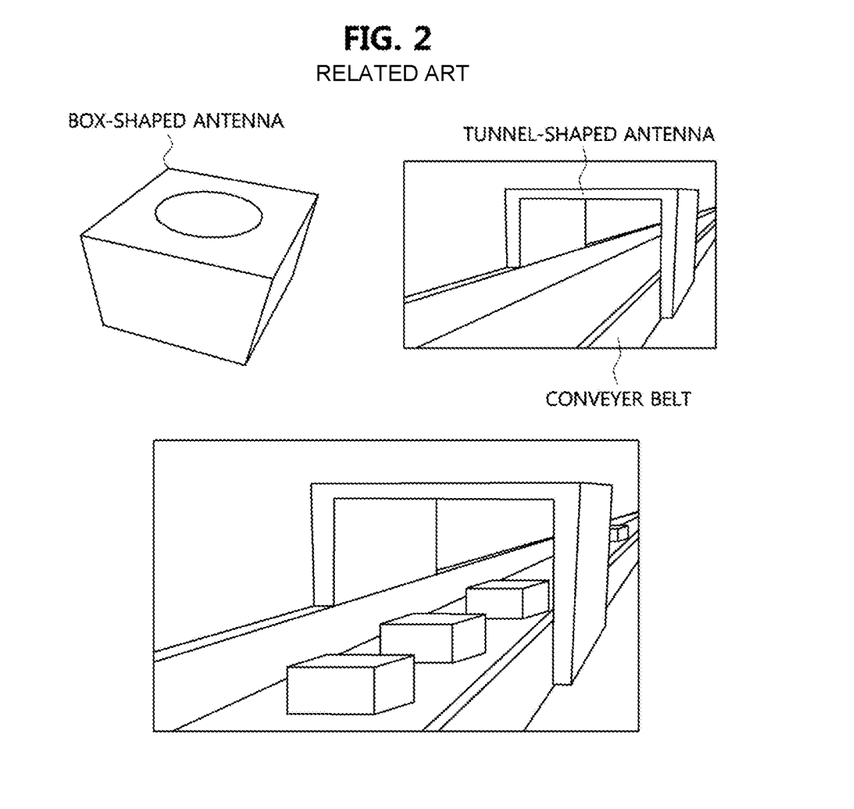
FIG. 2 is a diagram for describing a conventional electromagnetic wave shielding method which is used to solve a cross-reading problem of an RFID technology.

FIG. 2 is a diagram for describing a conventional electromagnetic wave shielding method which is used to solve the cross-reading problem of the RFID technology.

Referring to FIG. 2, an electromagnetic wave shielding method may be used to solve the cross-reading problem occurring in the RFID technology. As described above, the RFID technology uses an RF that has low rectilinearity in propagation, which may cause the cross-reading problem. Therefore, it may be possible to overcome the cross-reading problem by using the electromagnetic wave shielding method which prevents the RF used in the RFID technology from going out to another place or prevents a radio wave from entering from elsewhere.

The electromagnetic wave shielding method for overcoming the cross-reading problem in the RFID technology may be a method of locating an RFID reader antenna in an electromagnetic wave shielding box or tunnel and recognizing an RFID tag attached to an article by an RFID reader in the box or the tunnel. In other words, the electromagnetic wave shielding method can prevent the cross-reading problem since electromagnetic waves are shielded between adjacent conveyor belts through a shielding box or a tunnel. However, the electromagnetic wave shielding method is difficult to completely implement, incurs high costs, and requires continuous maintenance.

Figure 3:
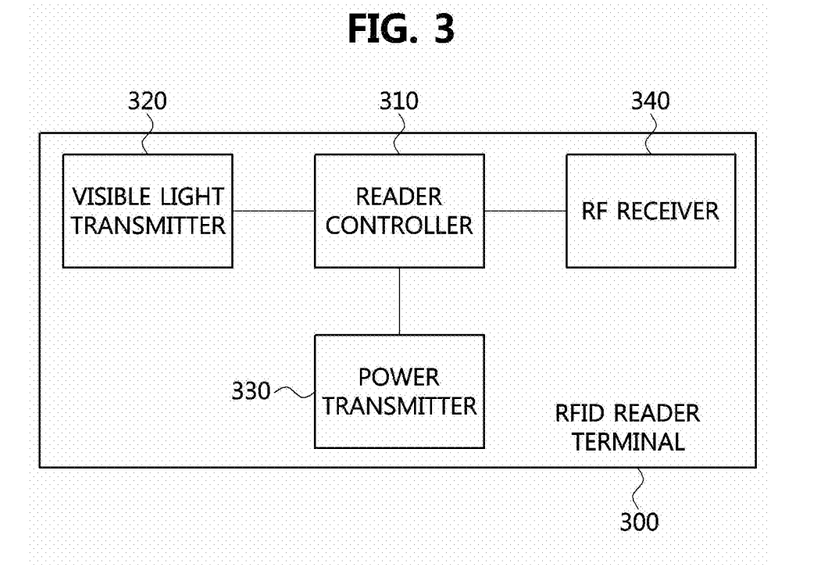
FIG. 3 is a block diagram of a configuration of an RFID reader terminal according to one embodiment of the present invention.

FIG. 3 is a block diagram of a configuration of an RFID reader terminal according to one embodiment of the present invention.

Referring to FIG. 3, an RFID reader terminal 300 according to one embodiment of the present invention may include a reader controller 310, a visible light transmitter 320, a power transmitter 330, and an RF receiver 340. Here, each component is not confined to a name thereof but is defined by a function thereof, and a plurality of components may be replaced by one component or one component may be replaced by a plurality of components according to the functionality.

An identification value of the RFID reader terminal 300 may be stored in the reader controller 310. In this case, the identification value may mean a 16-bit value and may be referred to as a handle, but is not limited thereto. In addition, the identification value may mean a unique value of the RFID reader terminal or a value that varies according to a predetermined interval, but is not limited thereto.

The reader controller 310 may determine whether information of an RFID tag terminal is recognized on the basis of an identification value of the RFID tag terminal received through the RF receiver 340, which will be described below, and the identification value of the RFID reader terminal 300. More specifically, the reader controller 310 may determine whether the identification value of the RFID tag terminal is identical to the identification value of the RFID reader terminal 300. When the two identification values are identical to each other, the reader controller 310 may determine that an RF is received from the RFID tag terminal which is a target, thereby recognizing the information of the RFID tag terminal which the RF receiver 340 receives along with the identification value of the RFID tag terminal. In addition, when the identification value of the RFID tag terminal is different from the identification value of the RFID reader terminal, the reader controller 310 may determine that an RF is received from the RFID tag terminal which is not a target and may not recognize the information of the RFID tag terminal received by the RF receiver 340. In other words, the RFID reader terminal 300 according to one embodiment of the present invention recognizes the information of the RFID tag terminal through the comparison between the identification value of the RFID reader terminal and the identification value of the RFID tag terminal, thereby avoiding cross-reading.

The reader controller 310 may perform pulse interval encoding (PIE) on information which will be transmitted through a visible light signal, and may decode an RF signal on which frequency modulation zero (FM0) coding or miller coding is performed among the RF signals received by the RF receiver 340. However, the above-described encoding or decoding may be performed by the visible light transmitter 320 or the RF receiver 340, which will be described below, and is not limited to a particular performer.

The visible light transmitter 320 may transmit a visible light signal including the identification value of the RFID reader terminal to the RFID tag terminal which is a target. Here, the identification value of the RFID reader terminal may refer to the identification value stored in the reader controller 310. In other words, the visible light transmitter 320 may obtain the identification value of the RFID reader terminal from the reader controller 310. The visible light signal transmitted by the visible light transmitter 320 may have a query message format, and the query message format may be referred to as a "Vquery message format" by adding a letter "V," standing for visible, as one embodiment of the present invention uses the visible light signal. The Vquery message format will be described in more detail with reference to FIG. 8.

The visible light transmitter 320 may include a device, such as a light-emitting diode, capable of emitting visible light, and may flash visible light for visible light communication through which information using the visible light is transferred. In other words, the visible light transmitter 320 may transmit the identification value of the RFID reader terminal to the RFID tag terminal by flashing visible light.

The power transmitter 330 may transmit power to the RFID tag terminal so that the RFID tag terminal can operate. When the visible light transmitter 320 transmits a visible light signal to the RFID tag terminal, the power transmitter 330 may transmit power together with the visible light signal so that the RFID tag terminal can recognize the visible light signal and operate. The power transmitter 330 may use a continuous wave (CW) to transmit the power, but is not limited thereto, and may use a power transmission method used in an RFID technology using a typical passive tag.

The RF receiver 340 may receive an RF transmitted by the RFID tag terminal. The RF received by the RF receiver 340 may include the identification value of the RFID tag terminal and the information of the RFID tag terminal. The RF received by the RF receiver 340 may have an ACK reply message format, and the ACK reply message format may be referred to as a "VACK reply message format" by adding a letter "V," standing for visible, as one embodiment of the present invention uses visible light. The VACK reply message format will be described in more detail with reference to FIG. 9.

The RFID reader terminal 300 according to one embodiment of the present invention may include at least one processor and a memory for storing at least one command causing the at least one processor to execute the above-described operation. Here, the processor may execute a program command stored in the memory and may refer to a central processing unit (CPU), a graphics processing unit (GPU), or a dedicated processor to perform methods according to the present invention. The memory may be configured with a volatile storage medium and/or a non-volatile storage medium, and be configured with a read only memory (ROM) and/or a random access memory (RAM). In addition, the RFID reader terminal 300 according to one embodiment of the present invention may further include at least one of a visible light transmission module capable of transmitting a visible light signal and an antenna capable of transceiving an RF.

Figure 4:
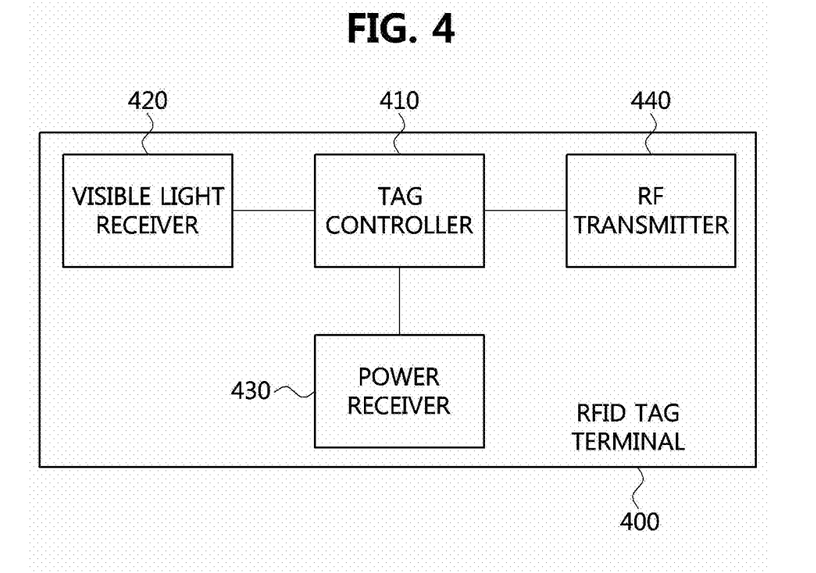
FIG. 4 is a block diagram illustrating a configuration of an RFID tag terminal according to one embodiment of the present invention.

FIG. 4 is a block diagram illustrating a configuration of an RFID tag terminal according to one embodiment of the present invention.

Referring to FIG. 4, an RFID tag terminal 400 according to one embodiment of the present invention may include a tag controller 410, a visible light receiver 420, a power receiver 430, and an RF transmitter 440. Here, each component is not confined to a name thereof but is defined by a function thereof, and a plurality of components may be replaced by one component or one component may be replaced by a plurality of components according to the functionality.

The tag controller 410 may extract an identification value of an RFID reader terminal from a visible light signal including the identification value of the RFID reader terminal received through the visible light receiver 420, which will be described below. In addition, the tag controller 410 may determine the extracted identification value of the RFID reader terminal intact as an identification value of the RFID tag terminal and may transmit, along with information of the RFID tag terminal, an identification value of the RFID tag terminal that is determined through the RF transmitter 440, which will be described below, using a backscattering method to the RFID reader terminal 300.

The backscattering method is one of coupling methods and may mean a method of adding information of a passive tag terminal including identification (ID) of the tag terminal to a signal of a reader and transmitting the signal to a reader terminal.

The tag controller 410 may decode a signal on which PIE is performed among visible light signals received by the visible light receiver 420, which will be described below, and may perform FM0 or miller coding on information which will be transmitted through an RF signal. However, the above-described encoding or decoding may be performed by the visible light receiver 420 or the RF transmitter 440, which will be described below, and is not limited to a particular performer.

The visible light receiver 420 may receive the visible light signal transmitted by the RFID reader terminal, and provide information included in the visible light signal to the tag controller 410. Here, the information included in the visible light signal may have a query message format or a Vquery message format, which has been described with reference to FIG. 3. More details thereof will be described with reference to FIG. 8.

The visible light receiver 420 may include a device that detects visible light and may analyze flashing of visible light in order to obtain information included in the visible light signal transmitted by the RFID reader terminal. In other words, the visible light receiver 420 may receive the identification value of the RFID reader terminal through an analysis of flashing of visible light.

The power receiver 430 may receive a CW transmitted by the RFID reader terminal and supply power on the basis of the received CW such that the RFID tag terminal 400 can operate. More specifically, the power receiver 430 may include at least one capacitor, charge the capacitor on the basis of the CW of the RFID reader terminal, and operate the RFID tag terminal 400 using the charged capacitor as a battery. In other words, the RFID tag terminal 400 according to one embodiment of the present invention may be a passive tag that may be operated by the CW of the RFID reader terminal, but is not limited thereto.

The RF transmitter 440 may transmit the RF including the identification value of the RFID tag terminal and the information of the RFID tag terminal to the RFID reader terminal. Here, the information included in the RF may have an ACK reply message format or a VACK reply message format, which has been described with reference to FIG. 3. More details thereof will be described with reference to FIG. 9.

The RFID tag terminal 400 according to one embodiment of the present invention may include at least one processor and a memory for storing at least one command causing the at least one processor to execute the above-described operation. Here, the processor may execute a program command stored in the memory and may refer to a CPU, a GPU, or a dedicated processor to perform methods according to the present invention. The memory may be configured with a volatile storage medium and/or a non-volatile storage medium, and be configured with a ROM and/or a RAM. In addition, the RFID tag terminal 400 according to one embodiment of the present invention may further include at least one of a visible light receiving module capable of receiving visible light and an antenna capable of transceiving an RF.

Figure 5:
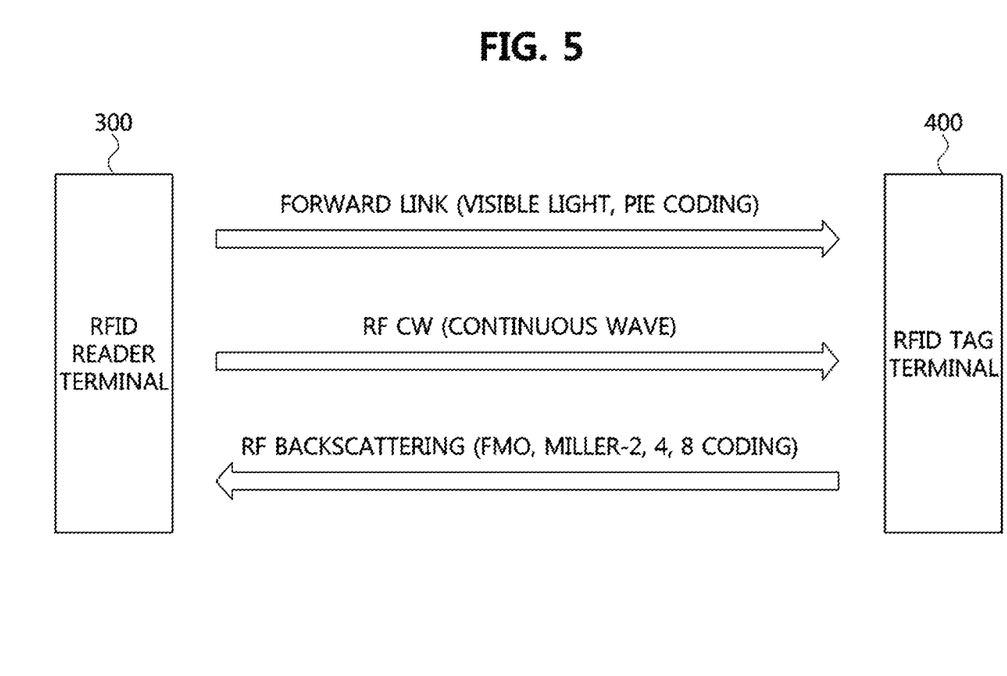
FIG. 5 is a diagram illustrating signals transmitted and received between an RFID reader terminal and an RFID tag terminal according to one embodiment of the present invention.

FIG. 5 is a diagram illustrating signals transmitted and received between an RFID reader terminal and an RFID tag terminal according to one embodiment of the present invention.

Referring to FIG. 5, an apparatus for avoiding cross-reading of RFID using visible light recognition according to one embodiment of the present invention may be implemented by signal transmission and reception between an RFID reader terminal 300 and an RFID tag terminal 400.

The RFID reader terminal 300 may transmit a visible light signal to the RFID tag terminal 400 through a forward link. Here, the visible light signal may include an identification value of the RFID reader terminal and may have a Vquery message format. In addition, data coding may be performed on the Vquery message format through a PIE method and then the coded format may be transmitted to the RFID tag terminal 400.

In this case, the PIE method may mean a method of adjusting a pulse width (PW) using a reference cycle of a signal such that the sum of a low PW interval in which energy is not transmitted and a high PW interval in which energy is transmitted becomes the reference cycle 1Tari of a transmitted signal. In addition, the RFID reader terminal 300 may transmit a CW as an RF in order to supply power such that the RFID tag terminal 400 can operate.

The RFID tag terminal 400 may operate using the CW received from the RFID reader terminal 300 and may transmit an RF signal to the RFID reader terminal 300. More specifically, the RFID tag terminal 400 may extract the identification value of the RFID reader terminal from the visible light signal received from the RFID reader terminal 300, recognize the identification value of the RFID reader terminal intact as an identification value of the RFID tag terminal, and transmit an RF signal that includes the identification value of the RFID tag terminal and information including an ID of the RFID tag terminal, using a backscattering method, to the RFID reader terminal 300. In this case, the identification value of the RFID tag terminal and the information of the RFID tag terminal, which are included in the RF signal, may have a VACK reply message format. In addition, FM0 coding or miller coding may be performed on the VACK reply message format and then the coded format may be transmitted to the RFID reader terminal 300.

In this case, the FM0 coding may refer to a method of coding such that a phase is inverted at every symbol boundary and another phase invert exists in the middle of symbol 0. The miller coding may refer to a method of coding such that a phase is inverted between two "0" symbols and phase invert exists in the middle of symbol 1. The FM0 coding can obtain a high data rate and the miller coding can achieve a wide guard band.

Figure 6:
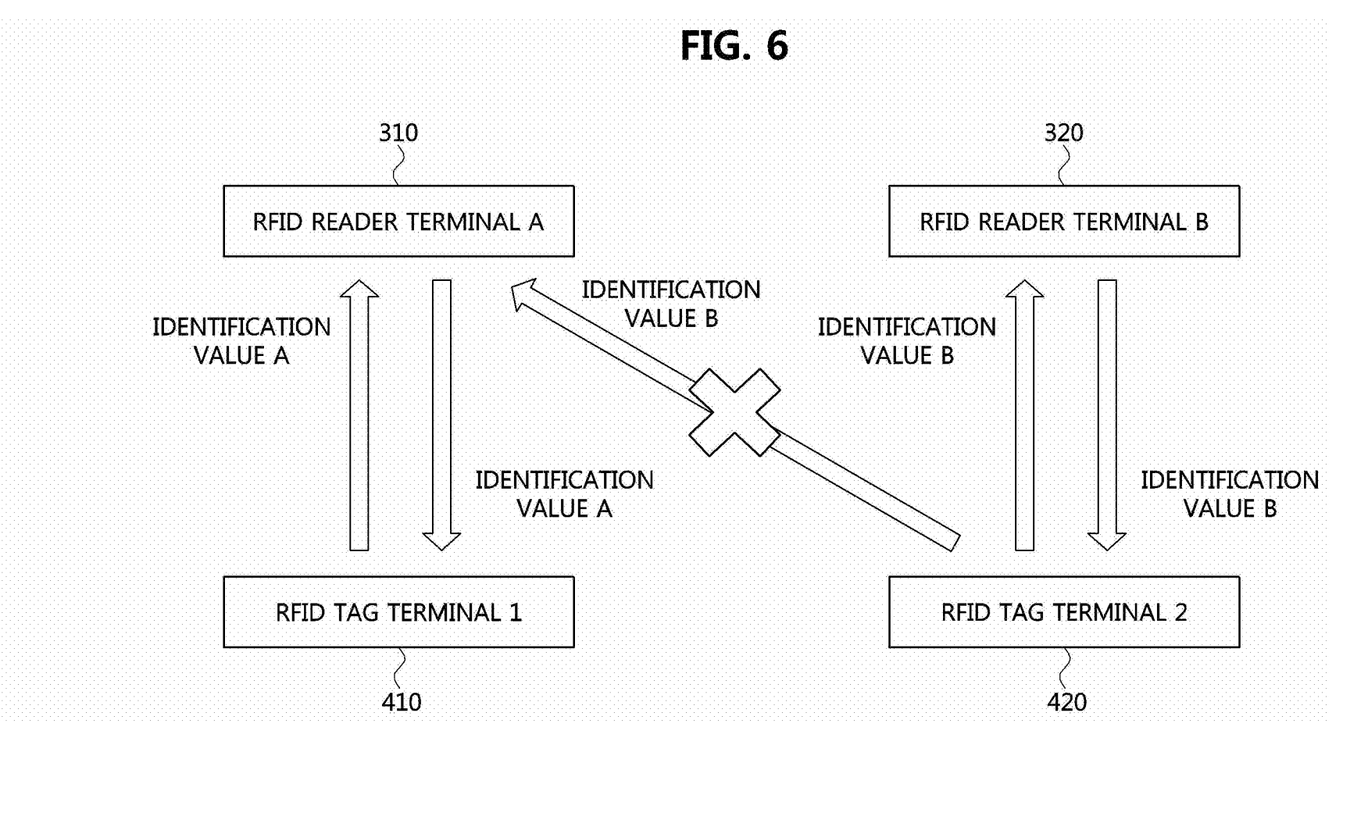
FIG. 6 is a conceptual diagram illustrating a method of avoiding cross-reading of RFID using visible light recognition according to one embodiment of the present invention.

FIG. 6 is a conceptual diagram illustrating a method of avoiding cross-reading of RFID using visible light recognition according to one embodiment of the present invention.

Referring to FIG. 6, it is assumed that RFID reader terminal A 310 attempts to recognize information of RFID tag terminal 1 410 and RFID reader terminal B 320 attempts to recognize information of RFID tag terminal 2 420. In addition, in order to describe the method of avoiding cross-reading of RFID, it is assumed that the RFID reader terminal A 310 and the RFID reader terminal B 320 are located in proximity to each other and the RFID tag terminal 1 410 and the RFID tag terminal 2 420 are located in proximity to each other.

The RFID reader terminal A 310 may transmit a visible light signal including identification value A of the RFID reader terminal A to the RFID tag terminal 1 410 and the RFID tag terminal 1 410 may recognize the received identification value A as an identification value of the RFID tag terminal 1 410 and transmit an RF signal including the identification value A intact to the RFID reader terminal A 310. The RFID reader terminal A 310 may determine whether the identification value A included in the received RF signal is identical to the identification value A transmitted by the RFID reader terminal A 310 itself, and when the two identification values are identical, may recognize information of the RFID tag terminal 1 310 included in the RF signal. The RFID reader terminal B 320 and the RFID tag terminal 2 420 may perform operations in the same manner as the RFID reader terminal A 310 and the RFID tag terminal 1 410.

However, although the RFID tag terminal 2 420 has received a visible light signal including identification value B from the RFID reader terminal B 320 and transmitted an RF signal including the identification value B to the RFID reader terminal B 320, the RFID reader terminal A 310 may receive the same RF signal. In this case, the RFID reader terminal A 310 may not recognize information of the RFID tag terminal 2 420 included together with the identification value B in the RF signal since the own identification value A of the RFID reader terminal A 310 is different from the received identification value B. In other words, the method of avoiding cross-reading of RFID using visible light recognition according to one embodiment of the present invention may clarify a forward link from a reader terminal to a tag terminal using rectilinear propagation of visible light and identifies and recognizes an RF of a target RFID tag terminal using an identification value.

Figure 7:
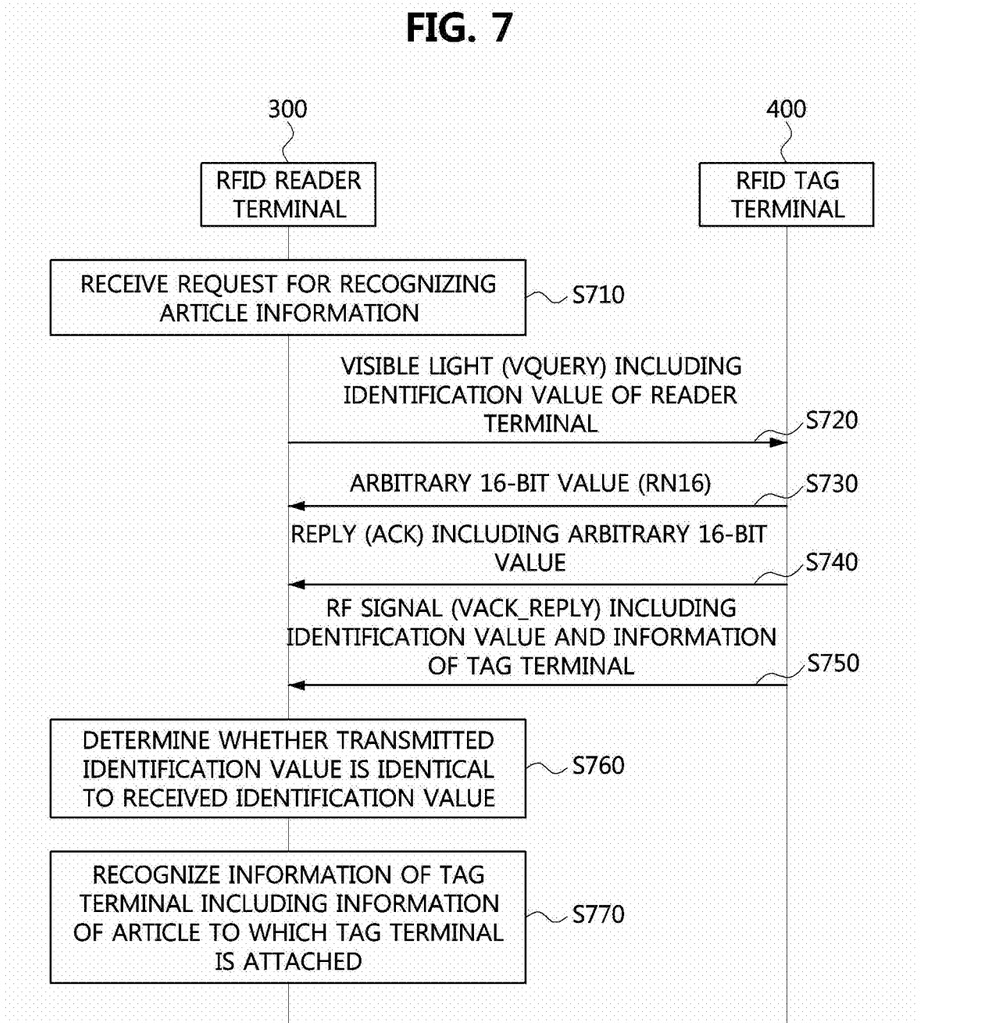
FIG. 7 is a flowchart illustrating a method of avoiding cross-reading of RFID using visible light recognition according to one embodiment of the present invention.

FIG. 7 is a flowchart illustrating a method of avoiding cross-reading of RFID using visible light recognition according to one embodiment of the present invention.

Referring to FIG. 7, in order to describe the method of avoiding cross-reading of RFID using visible light recognition according to one embodiment of the present invention, it is assumed that an RFID tag terminal in which information of an article is stored is attached to the article and an RFID reader terminal recognizes the information of the article from the RFID tag terminal attached to the article.

First, an RFID reader terminal 300 may receive a request for recognizing article information from a user or a manager (S710). The RFID reader terminal 300 which has received the request for recognition may transmit a visible light signal including an identification value of the RFID reader terminal to an RFID tag terminal 400 (S720). In this case, the identification value may be a 16-bit value and may be referred to as a handle, but is not limited thereto.

The RFID tag terminal 400 may transmit an RF signal including the identification value included in the visible light signal and information of the RFID tag terminal to the RFID reader terminal 300. More specifically, when the RFID tag terminal 400 receives the visible light signal, the RFID tag terminal 400 may transmit an arbitrary 16-bit value to the RFID reader terminal 300 (S730), and the RFID reader terminal 300 may transmit an ACK replay including the received arbitrary 16-bit value to the RFID tag terminal 400 (S740). In this case, the ACK reply may include the arbitrary 16-bit value using a backscattering method. The RFID tag terminal 400 which receives the ACK reply may transmit an RF signal including the identification value included in the received visible light signal and the information of the RFID tag terminal to the RFID reader terminal 300 when the transmitted arbitrary 16-bit value is identical to the received arbitrary 16-bit value (S750).

The RFID reader terminal 300 may determine whether the transmitted identification value is identical to the received identification value (S760), and may recognize the information of the RFID tag terminal included in the RF signal when the two identification values are identical to each other (S770). Here, the information of the RFID tag terminal may include the information of the article to which the RFID tag terminal 400 is attached. However, when the transmitted identification value is different from the received identification value, it is determined that an RF signal of another RFID tag terminal that is not a target RFID tag terminal is received, and the RFID reader terminal 300 may not recognize the information of the RFID tag terminal included in the RF signal.

Figure 8:
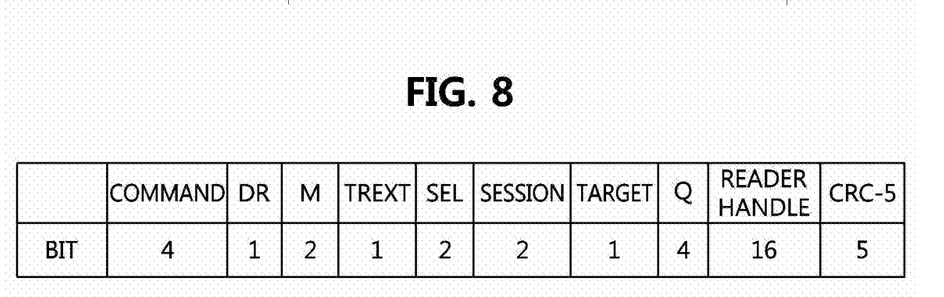
FIG. 8 is a diagram illustrating a structure of a message transmitted by an RFID reader terminal according to one embodiment of the present invention.

FIG. 8 is a diagram illustrating a structure of a message transmitted by an RFID reader terminal according to one embodiment of the present invention.

Referring to FIG. 8, a message, Vquery, transmitted by an RFID reader terminal according to one embodiment of the present invention may include Command, DR, M, TRext, Sel, Session, Target, Q, Reader Handle, and CRC-5. Here, the Command may indicate that the corresponding message is a query, and the DR may indicate a forward link frequency. The M may indicate a forward link data rate and a modulation format, and the TRext may indicate whether a pilot tone, which is a particular reference signal, will be used in a forward signal preamble. The Sel may indicate selection of a tag that responds to a query, and the Session may indicate a session of inventory round. The Target may indicate whether a tag has an inventory flag of A or an inventory flag of B in the inventory round, and the Q may indicate the number of slots in the round. In addition, the Reader Handle may indicate an identification value of the RFID reader terminal, and the CRC-5 may indicate a value for detecting an error in order to protect the message. The terms used to describe the above-described configuration may be terms used in the conventional RFID technology.

Figure 9:
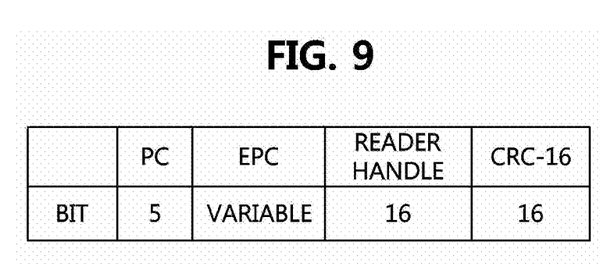
FIG. 9 is a diagram illustrating a structure of a message transmitted by an RFID tag terminal according to one embodiment of the present invention.

FIG. 9 is a diagram illustrating a structure of a message transmitted by an RFID tag terminal according to one embodiment of the present invention.

Referring to FIG. 9, a message, VACK reply, transmitted by an RFID tag terminal according to one embodiment of the present invention may include PC, EPC, Reader Handle, and CRC-16. Here, the PC may indicate protocol control information and have a size of 5 bits. The EPC may indicate information of an article and the size of the EPC may be variable. In addition, the Reader Handle may indicate an identification value received from an RFID reader terminal and have a size of 16 bits. The CRC-16 may indicate a value for detecting an error in order to protect the message and have a size of 16 bits.

The size of the EPC may generally have a size of 96 bits, but is not limited thereto, and may be determined by a value of the PC. For example, when the value of the PC is "00110," which indicates 6 words, the EPC may have a size of 96 bits resulting from 6×16 bits. When the value of the PC is "01000," which indicates 8 words, the EPC may have a size of 128 bits resulting from 8×16 bits. The terms used to describe the above-described configuration may be terms used in a conventional RFID technology.

According to the present invention, it is possible to correctly receive only information of a tag of interest without having to use an electromagnetic wave shielding method.

According to the present invention, since a visible light signal is used, it is possible to intuitively recognize an object and confirm whether information of a correct tag is received.

According to the present invention, it is possible to minimize interference between a plurality of readers and a plurality of tags even in a dense environment in which the plurality of readers and the plurality of tags are installed.

While the example embodiments of the present invention and their advantages have been described in detail, it should be understood that various changes, substitutions and alterations may be made herein without departing from the scope of the invention.

What is claimed is:

1. A radio frequency identification (RFID) reader terminal comprising:
   a visible light transmitter configured to transmit a visible light signal including an identification value of the RFID reader terminal;
   a radio frequency (RF) receiver configured to receive an RF signal including an identification value of an RFID tag terminal and information of the RFID tag terminal from the RFID tag terminal; and
   a reader controller configured to determine whether the identification value of the RFID reader terminal is identical to the identification value of the RFID tag terminal,
   wherein the reader controller recognizes the information of the RFID tag terminal when the identification value of the RFID reader terminal is identical to the identification value of the RFID tag terminal.

2. The RFID reader terminal of claim 1, further comprising a power transmitter configured to transmit power to the RFID tag terminal using a continuous wave (CW).

3. The RFID reader terminal of claim 1, wherein pulse interval encoding (PIE) has been performed on the visible light signal.

4. The RFID reader terminal of claim 1, wherein the RF signal includes the identification value of the RFID tag terminal and the information of the RFID tag terminal through a backscattering method.

5. The RFID reader terminal of claim 1, wherein frequency modulation zero (FM0) coding or miller coding has been performed on the RF signal.

6. The RFID reader terminal of claim 1, wherein the identification value of the RFID reader terminal is an arbitrary 16-bit value.

7. A radio frequency identification (RFID) tag terminal comprising:
   a visible light receiver configured to receive a visible light signal including an identification value of an RFID reader terminal from the RFID reader terminal;
   a tag controller configured to store information of an article, which the RFID tag terminal is attached to, as information of the RFID tag terminal and to determine the identification value of the RFID reader terminal as an identification value of the RFID tag terminal; and
   a radio frequency (RF) transmitter configured to transmit an RF signal including the identification value of the RFID tag terminal and the information of the RFID tag terminal to the RFID reader terminal,
   wherein the information of the RFID tag terminal is recognized by the RFID reader terminal when the identification value of the RFID reader terminal is identical to an identification value of the RFID tag terminal.

8. The RFID tag terminal of claim 7, further comprising a power receiver configured to receive power from the RFID reader terminal through a continuous wave (CW).

9. The RFID tag terminal of claim 7, wherein pulse interval encoding (PIE) has been performed on the visible light signal.

10. The RFID tag terminal of claim 7, wherein the RF signal includes the identification value of the RFID tag terminal and the information of the RFID tag terminal through a backscattering method.

11. The RFID tag terminal of claim 7, wherein frequency modulation zero (FM0) coding or miller coding has been performed on the RF signal.

12. The RFID tag terminal of claim 7, wherein the identification value of the RFID reader terminal is an arbitrary 16-bit value.

13. A method of recognizing tag information, which is performed by a radio frequency identification (RFID) reader terminal, the method comprising:
- transmitting a visible light signal including an identification value of the RFID reader terminal;
- receiving a radio frequency (RF) signal including an identification value of an RFID tag terminal and information of the RFID tag terminal from the RFID tag terminal; and
- determining whether the identification value of the RFID reader terminal is identical to the identification value of the RFID tag terminal,
- wherein the determining of whether the identification value of the RFID reader terminal is identical to the identification value of the RFID tag terminal comprises recognizing the information of the RFID tag terminal when the identification value of the RFID reader terminal is identical to the identification value of the RFID tag terminal.

14. The method of claim 13, further comprising transmitting power to the RFID tag terminal through a continuous wave (CW).

15. The method of claim 13, wherein pulse interval encoding (PIE) has been performed on the visible light signal.

16. The method of claim 13, wherein the RF signal includes the identification value of the RFID tag terminal and the information of the RFID tag terminal through a backscattering method.

17. The method of claim 13, wherein frequency modulation zero (FM0) coding or miller coding has been performed on the RF signal.

18. The method of claim 13, wherein the identification value of the RFID reader terminal is an arbitrary 16-bit value.

* * * * *